United States Patent [19]
Davies et al.

[11] Patent Number: 5,066,088
[45] Date of Patent: Nov. 19, 1991

[54] OPTICAL VARIABLE DELAY LINE AND VARIABLE-FREQUENCY FIBER-OPTIC MULTIPLEXER

[75] Inventors: David K. Davies; Peter J. Chantry, both of Churchill; Anastasios P. Goutzoulis, Pittsburgh, all of Pa.

[73] Assignee: Westinghouse Electric Corp., Pittsburgh, Pa.

[21] Appl. No.: 572,835

[22] Filed: Aug. 27, 1990

[51] Int. Cl.⁵ .............................................. G02B 6/32
[52] U.S. Cl. ...................................... 385/25; 385/27; 385/33; 385/52
[58] Field of Search ............... 350/96.29, 96.15, 96.18, 350/96.19

[56] References Cited
U.S. PATENT DOCUMENTS

| | | | |
|---|---|---|---|
| 4,671,605 | 6/1987 | Soref | 350/96.15 |
| 4,815,806 | 3/1989 | Owen | 350/96.18 |
| 4,959,540 | 9/1990 | Fan et al. | 350/96.15 X |

OTHER PUBLICATIONS

John AuYeung, *Appl. Phys. Lett.* 38, 308–310 (1981).
A. Takada, M. Saruwatari, *Electron Lett.* 24, 1406–1408 (1988).

*Primary Examiner*—John D. Lee
*Assistant Examiner*—Stephen W. Barns
*Attorney, Agent, or Firm*—John K. Williamson; Norman A. Nixon

[57] ABSTRACT

A fiberoptic-coupled free-space variable delay line is provided wherein the phase adjustment of the signal can be accurately set. A microscope-objective lens collimates a signal beam which is received by a focusing lens. The focusing lens is provided on an adjustable carrier to allow one to accurately adjust the distance travelled by the collimated signal base and thereby accurately adjust the off-set. A plurality of these variable delay lines can be arranged to form a multiplexer. If the threads on each drive rod moving a carrier are different, the carrier can be adjusted to accommodate changes in frequency of the signal.

10 Claims, 3 Drawing Sheets

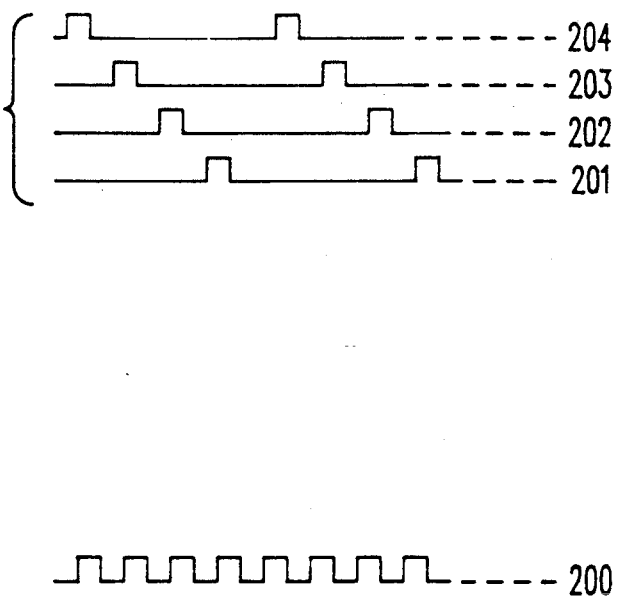
FIG. 4
FIG. 5
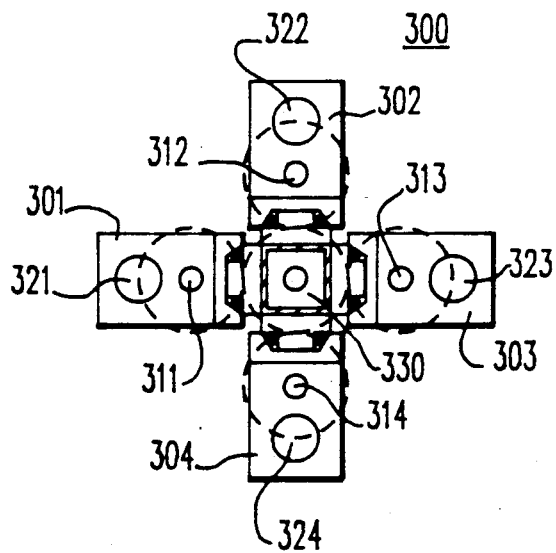
FIG. 6

OPTICAL VARIABLE DELAY LINE AND VARIABLE-FREQUENCY FIBER-OPTIC MULTIPLEXER

BACKGROUND OF THE INVENTION

1. Field of the Invention

This invention relates to the field of high speed optical delay lines and fiber-optic multiplexers.

2. Description of the Prior Art

The precise control of the relative timing of multiple pulse trains is often a critical factor in the synchronization of different components in a system, such as, for example, in a time-multiplexing application. The use of variable time delay is a convenient means of providing this phase control. Conventional techniques, such as the utilization of a predetermined length of coaxial cable, are currently used to provide this phase control. However, for high-speed (multi-gigahertz) signals, conventional coaxial cable delay lines experience capacitance-loading and attenuation effects. Moreover, because the attenuation effects of electronic processing vary with frequency, the usefulness of a coaxial cable delay line over a wide range of frequencies is suspect. Consequently, there is a need for a delay line which performs well over a range of signals including high speed signals.

In a time-multiplexing application, the outputs of n parallel channels are multiplexed to provide a single serial channel, where the bit rate, f, of the individual channels is converted into a stream having a bit rate of nf. This may be accomplished by connecting each of the n signal lines to a delay line and combining the outputs from the delay lines into a single channel. The delay lines are designed so that the delays introduced in successive lines increase linearly. The increment in delay-line length is the product of the velocity of light multiplied by the period of the desired signal stream.

A commonly used technique to create delay lines for time-multiplexing applications is to use a series of fixed length delay lines. For any particular arrangement of fixed-length delay lines, the frequency of the multiplexed signals must be kept constant. However, in many applications (e.g. digital testing), it is desirable to provide the capability of varying the frequency of the multiplexed signal. Consequently, there is a need for a multiplexer which can operate over a variety of frequencies.

SUMMARY OF THE INVENTION

The use of optical processing to implement a delay element is an attractive method because of its accuracy of phase control and its minimal attenuation effects. The present invention provides an arrangement for an optical delay line which provides a continuously-variable delay time with low variation in the signal amplitude over the delay range. An extension of this arrangement also provides the means of simultaneously controlling the relative delays of multiple lines as required, for example, in a variable-frequency, fiber-optic multiplexer.

In this context, the upper limit of the range of delay time is that which corresponds to a complete period of the lowest frequency under consideration. The lower limit of the delay-time range is set by the necessity of providing resolution corresponding to approximately 5% of the period of the highest frequency under consideration. For high-frequency waveforms in the range 1-100 GHz, the corresponding range of delay time required is 0.01-1 ns, and the resolution in delay time required is 0.5 ps.

In our variable delay line, an incoming signal is used to modulate a laser diode to provide an optical signal of the radio frequency waveform. The optical beam emitted by the laser diode is collimated using a microscope type-objective lens. The numerical aperture of the lens can be selected to ensure that approximately 70% of the divergent beam emitted from typical laser diodes is collected.

The laser diode is mounted in a fixed position at one end of carriage unit such as a precision optical bench. A suitable focusing-lens/optical-fiber collector combination is mounted on a motor-driven carrier such that the collimated beam emitted from the laser diode is focused on the fiber for all positions of the collector relative to the laser diode. The output from the fiber is then coupled to an appropriate detector for converting the optical signal back to radio frequency. The focusing lens is a microscope type-objective lens whose numerical aperture is generally matched to that of optical fiber. The choice of detector and fiber type depends on the frequency range to be covered; at the higher frequencies, single-mode fiber and a small-area detector may be used.

The collimating/focusing lens combination gives a magnification which is sufficiently low to ensure a focused beam diameter at the fiber which is less than the fiber core diameter (even for single-mode fiber). The distance of the carriage (supporting the focusing-lens/fiber combination) relative to the laser diode is varied by driving a threaded rod which is supported by bearings at both ends. The rod is threaded through the carrier and is connected to the shaft of a stepper motor.

A plurality of these variable delay lines can be combined to provide a variable-frequency multiplexer. Such a variable-frequency multiplexer provides the capability of varying the length (L) of the n delay lines such that the linear delay-time relationship of successive delay lines is maintained. For n multiplexed lines, the required relationship is:

$$L_n - L_{n-1} = c/f_m, \qquad (1)$$

where c is the speed of light and $f_m$ is the frequency of the multiplexed signal, presupposing that the input pulsewidth of the signal on each individual line is less than $\tfrac{1}{2} f_m$.

In the variable-frequency multiplexer, the frequency $f_m$ is varied by using n different variable delay lines identical to the variable delay line discussed above. Each of the lines is arranged so that the optical-collector carrier of each line is driven at a different linear speed ($v_n$) from a single drive motor. After a given time (T) the delay length ($L_n$ which = $v_n$ T) satisfies the relationship of Equation (1). The drive speed is given by the relationship:

$$v_n = \Omega P, \qquad (2)$$

where $\Omega$ is the angular speed of the drive rod and P is the pitch of the thread on the rod. Thus, $v_n$ can be varied through the use of gears or by using drive rods of different pitch or both, but where the drive power is supplied from a single motor. The output from each of the equal-length fibers is then combined at the detector. Any variations in the firing time of the different laser diodes and variations in the fiber lengths are easily compensated by appropriate relative positioning of the collectors during assembly.

BRIEF DESCRIPTION OF THE DRAWINGS

FIG. 4 is a schematic representation of the wave patterns of the input optical fibers of the variable-frequency multiplexer of FIG. 3.

FIG. 5 is a schematic representation of the wave pattern of the output optical fiber of the variable-frequency multiplexer of FIG. 3.

FIG. 6 is an end view of an alternative embodiment of the variable-frequency multiplexer of the present invention.

DESCRIPTION OF THE PREFERRED EMBODIMENT

Figure 1:
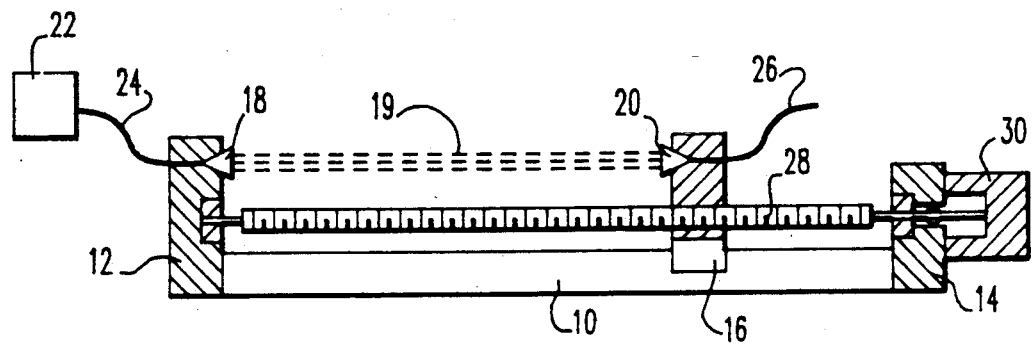
FIG. 1 is a side elevational view of a presently preferred embodiment of the variable delay line of the present invention.

As shown in FIG. 1, we provide a variable delay line having a carriage unit, such as optical bench 10, bounded by end segments 12 and 14. A movable carrier 16 is provided intermediate end segments 12 and 14. A collimating, microscope objective lens 18 is fixed in end segment 12. A focusing lens 20 is mounted on carrier 16. Threaded drive rod 28 and stepper motor 30 move carrier 16 within optical bench 10 between end segments 12 and 14. Fiber-optic cable 24 carries the signal from laser diode 22 to collimating lens 18. Fiber-optic cable 26 carries the signal from focusing lens 20 to a detector, not shown. Alternatively, focusing lens 20 can be mounted on either of end segments 12 and 14 and collimating lens 18 mounted on carrier 16.

In order to achieve the required time-delay resolution, we use free space as the delay medium since this has the highest propagation velocity and, consequently, the largest spatial distance for a given delay. Thus, the required resolution of 0.5 ps corresponds to a practically-achievable spatial resolution of 0.15 mm, while the maximum distance of 30 cm (corresponding to the longest required delay of 1 ns) is not unreasonably large.

The necessary spatial resolution between collimating lens 18 and focusing lens 20 is achieved by a suitable choice of motor 30 and drive screw 28. The preferred motor 30 is a stepper motor which has a step angle of 15°. For a screw thread 28 of 1 mm pitch, this angular increment corresponds to a linear motion of approximately 0.04 mm, i.e., well within the required resolution. The slew rate of the motor 30 (no load rate of 1500 steps/s) is such that the complete 30 cm travel is easily accomplished in less than 30 seconds.

The necessary optical alignment of collimating lens 18 and focusing lens 20 required to maintain the collected intensity constant to within 0.5 dB is accomplished by using an expanded optical beam 19 and an optical bench 10 of suitable precision. A collimating lens 18 having 20× magnification gives a beam 19 diameter of 4.9 mm. It can be shown that for two circular areas of the same diameter, D, whose centers are displaced by a distance, s, the ratio, F, of the overlap area to the circular area is given by $$F = 1 - \frac{2}{\pi}\left[\left(\frac{s}{D}\right)\sqrt{1 - \left(\frac{s}{D}\right)^2} + \sin^{-1}\left(\frac{s}{D}\right)\right].$$

Thus, the relative displacement of the collector 20 with respect to the collimator 18 should be kept below ±8% of the beam diameter over the maximum travel length. This is easily achieved using an optical bench 10 having a miniature guide and carriage which provides a maximum running parallelism of ±0.006 mm over a length of 30 cm.

The complete variable delay line is fairly compact. The overall cross-sectional dimensions of the guide and carrier are 1.7 cm wide×0.8 cm high. The length of the carrier is 2.35 cm, and the length of the guide is 30 cm. The mounts for the laser diode 22, lenses 18 and 20, and bearings add a further 3 cm to the height, and the motor a further 3 cm to the length.

In operation, an incoming signal modulates laser diode 22 to provide an optical replica of the radio frequency waveform. For frequencies up to approximately 8 $GH_z$, direct current modulation of laser diode 22 can be used. For higher frequencies up to 100 $GH_z$, gain-switching can be used to modulate laser diode 22.

Laser diode 22 emits an optical beam which is collimated by collimating lens 18. A numerical aperture of approximately 0.4 ensures that approximately 70% of the divergent beam emitted from laser diode 22 is collected.

Collimated beam 19 is focused on focusing lens 20 which preferably has a magnification of approximately 10×. The numerical aperture of focusing lens 20 is approximately 0.25, a reasonably good match to that of optical fiber.

Because focusing lens 20 is provided on movable carrier 16, the distance between collimating lens 18 and movable lens 20 can be easily adjusted. When the distance between collimating lens 18 and movable lens 20 is adjusted, the path length of collimated beam 19 is likewise adjusted. This change in path length affects the time delay of the optical signal. Because the distance between collimating lens 18 and movable lens 20 can be precisely controlled, the time delay can likewise be set with precision.

Figure 2:
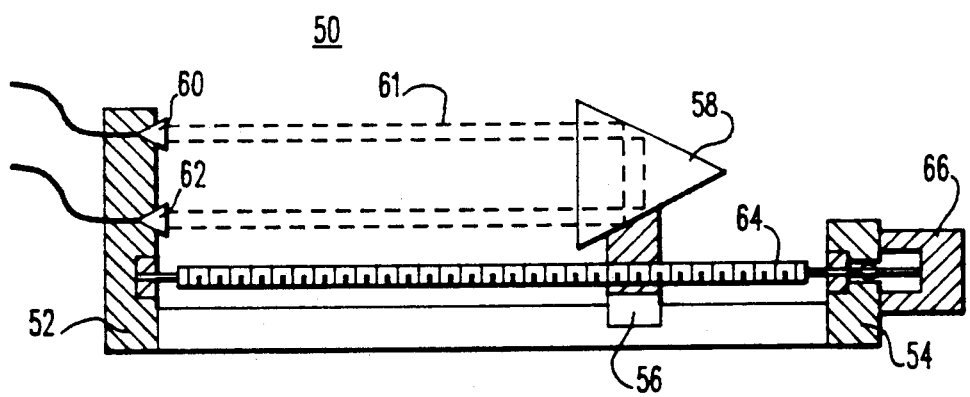
FIG. 2 is a side elevational view of an alternative embodiment of the variable delay line of the present invention.

FIG. 2 shows a variable delay line having an even more compact size. In this alternate embodiment, optical bench 50 has been modified by the addition of a prism 58 fixed to carrier 56. Drive rod 64 and stepper motor 66 cooperate to move carrier 56 within optical bench 50 between end segments 52 and 54. Collimating lens 60 and focusing lens 62 are positioned on end segment 52 in such a manner that collimated beam 61 from collimating lens 60 is reflected by prism 58 to focusing lens 62. Lateral movement of carrier 56, and with it prism 58, adjusts the length travelled by collimated beam 61, thereby adjusting the time-delay of the signal.

Figure 3:
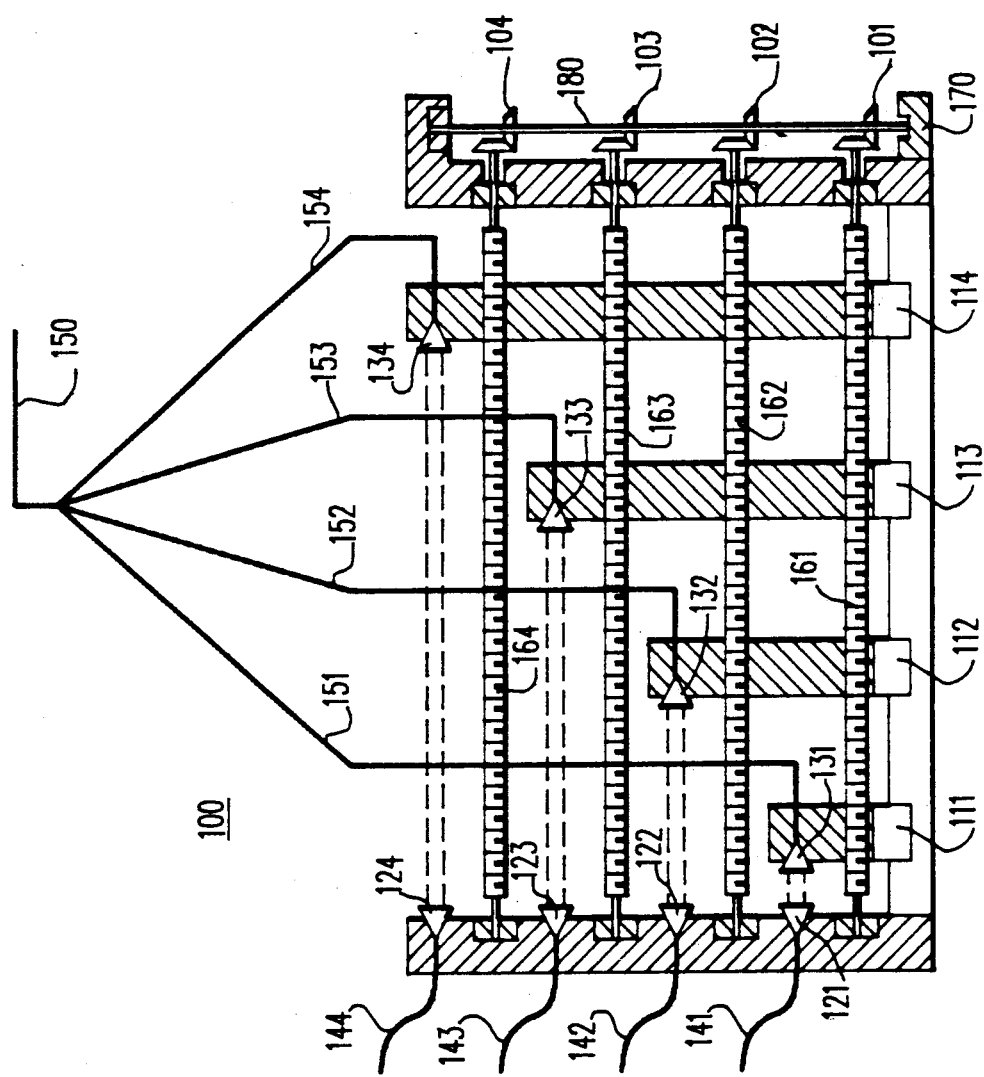
FIG. 3 is a side elevational view of a presently preferred embodiment of the variable-frequency multiplexer of the present invention.

FIG. 3 shows four variable delay lines 101, 102, 103 and 104 similar to that in FIG. 1 combining to form a variable-frequency multiplexer 100. Independent carriers 111, 112, 113 and 114 are provided for each of delay lines 101, 102, 103 and 104, respectively. Input signals are received from parallel input optical fibers 141, 142, 143 and 144. These signals are collimated by collimating lenses 121, 122, 123 and 124 and received by focusing lenses 131, 132, 133 and 134. The optically processed signal is then transmitted by equal-length output optical cables 151, 152, 153 and 154. Output optical cables 151, 152, 153 and 154 join to form multiplexed output line 150.

Carriers 111, 112, 113 and 114 are adjusted by means of threaded drive rods 161, 162, 163 and 164 which are all connected by means of gear box 180 to stepper motor 170. The pitch of the threads on each of drive rods 161, 162, 163 and 164 is different, so that each carrier 111, 112, 113 and 114 moves a different length during each step of the motor 170.

Because carriers 11, 112, 113 and 114 are adjusted at different lengths from collimating lenses 121, 122, 123 and 124, the distance travelled by the collimated beam for each delay line is also different. Because each collimated beam travels a different length, the signal from each of the delay lines 101, 102, 103 and 104 will be out-of-phase with respect to the others.

FIGS. 4 and 5 are schematic representations of the accumulated effects of the various delay lines. In FIG. 4, wave forms 201, 202, 203 and 204 represent time-delayed signals from delay lines 101, 102, 103 and 104, respectively. When these wave forms are combined, a wave form 200 shown in FIG. 5 is formed. The frequency of wave form 200 is four times the frequency of signals 201, 202, 203 and 204.

The settings of the delay lines 101, 102, 103 and 104 shown in FIG. 3 are adapted for use by a single frequency. If the frequency of the signal from parallel input optical cables 141, 142, 143 and 144 changes, the phase off-set caused by delay lines 101, 102, 103 and 104 will also change. Instead of being discrete regularly timed signals as in FIG. 5, output optic fiber 150 will have an irregular signal. Consequently, unless the time delay is adjusted with the change in frequency, the individual input signals will not form a multiplexed signal.

As shown in FIG. 3, drive rods 161, 162, 163 and 164 are provided with different pitched threads. When the stepper motor 170 is activated, each drive rod will rotate at a speed set in accordance with gear system 180. Because the pitch of the thread is different for each drive rod, each carrier 111, 112, 113 and 114 will move a different length upon each drive rod rotation. As shown in FIG. 3, gear box 180 can alternatively be used to adjust the relative off-set length of variable delay lines 101, 102, 103 and 104. The adjustment of each carrier 111, 112, 113 and 114 can thus be effected by one or both of gear system 180 and the different pitch threads on drive rods 161, 162, 163 and 164. Preferably, gear box 180 will act in cooperation with the different pitch threads to form an accurate frequency adjustable system. Because each carrier moves a different length, the relative offset in the phase of the signals from output cables 151, 152, 153 and 154 is also changed. A frequency change of the input signal can thus be corrected by a change in the offset of the carriers to reform the multiplexed signal 200.

FIG. 6 shows an alternate arrangement of four delay lines 301, 302, 303, and 304 to form a variable-frequency multiplexer 300. Delay lines 301, 302, 303 and 304, each being similar to the delay line of FIG. 1, are provided in separate carriage units which extends radially out from centrally positioned motor shaft 330. Motor shaft 330 causes drive rods 311, 312, 313 and 314 to rotate in turn. The drive rods 311, 312, 313 and 314 adjust the position of the lenses 321, 322, 323 and 324, respectively, thereby setting the distance traveled by the collimated beam in each of delay lines 301, 302, 303 and 304. Because each of the drive rods are provided with a different thread pitch, the relative positions of the phase off-set of delay lines 301, 302, 303 and 304 can be adjusted to accommodate a change in frequency of the signal.

While we have described a present preferred embodiment of the invention, it is to be distinctly understood that the invention is not limited thereto but may be otherwise embodied and practiced within the scope of the following claims.

We claim:

1. A high frequency optical delay line device comprising:
   (a) mounting means having a carriage unit, first and second end segments provided on opposite ends of said carriage unit;
   (b) a collimating lens secured to said mounting means, said collimating lens connected to a first optical fiber transmitting a signal, said collimating lens producing a collimated beam;
   (c) a focusing lens secured to said mounting means and positioned to receive said collimated beam, said focusing lens connected to an optical fiber collector which collects said collimated beam and transmits it through a second optical fiber;
   (d) adjustment means provided on said mounting means adapted to adjust the distance travelled by said collimated beam;
   (e) a carrier provided in said carriage unit; and
   (f) a reflecting means secured to said carrier, said reflecting means positioned to reflect said collimated beam from said collimating lens to said focusing lens;
   whereby the adjustment of said distance travelled by said collimated beam produced a change in the delay time.

2. The optical delay line device of claim 1 further comprising:
   (a) adjustment means having a threaded screw positioned in said carriage unit, and rotatably secured in said first and second end segments;
   (b) a drive means adapted to rotate said threaded screw; and
   (c) said carrier being adapted to receive said threaded screw therethrough and move within said carriage unit in response to the rotation of said threaded screw.

3. The optical delay line of claim 1 wherein said reflecting means is a prism.

4. A high frequency optical delay line device comprising:
   (a) mounting means;
   (b) a plurality of collimating lenses secured to said mounting means, each of said plurality of collimating lenses connected to one of a plurality of optical fibers transmitting a signal, each of said collimating lenses producing a collimated beam;
   (c) a plurality of focusing lenses secured to said mounting means, each of said focusing lenses positioned to receive one of said collimated beams, each of said focusing lenses connected to one of a plurality of optical fiber collectors which collect said collimated beams and transmit said beam to an output line; and
   (d) adjustment means provided on said mounting means, said adjustment means adapted to adjust the distance traveled by each of said collimated beams;

wherein said adjustment means provides a different phase set-off for each of said collimated beams to provide for a multiplexed output signal.

5. The optical delay line device of claim 4 wherein said adjustment means is adapted to be adjusted to provide a multiplexed signal over a range of frequencies.

6. The optical delay line device of claim 5 further comprising:
(a) mounting means having a carriage unit, first and second end segments provided on opposite ends of said carriage unit;
(b) adjustment means having a plurality of threaded screws positioned in said carriage unit rotatably secured in said first and second end segments, each of said threaded screws corresponding to one of said plurality of collimating lenses;
(c) a drive means adapted to rotate each of said threaded screws; and
(d) a plurality of carriers provided in said carriage unit, each of said carriers adapted to receive one of said plurality of threaded screws therethrough and move within said carriage unit in response to the rotation of said one of said plurality of threaded screws.

7. The optical delay line device of claim 6 wherein each of said focusing lenses are secured to one of said carriers.

8. The optical delay line device of claim 6 wherein each of said threaded screws is provided with a different pitch of thread whereby each of said carriers is moved a different length by said drive means.

9. The optical delay line device of claim 6 further comprising a gear system connecting said drive means and each of said threaded screws whereby said gear system rotates each of said threaded screws at a predetermined angular velocity whereby each of said carriers is moved a different length by said drive means.

10. The optical delay line device of claim 9 wherein each of said threaded screws is provided with a different pitch of thread whereby each of said carriers is moved a different length by said drive means.

* * * * *